United States Patent
Evrard

(10) Patent No.: US 6,722,868 B1
(45) Date of Patent: Apr. 20, 2004

(54) ROTARY STRETCH BLOW MOULDING MACHINE COMPRISING A MAGNETICALLY CONTROLLED STRETCH ROD

(75) Inventor: Alain Evrard, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 36 days.

(21) Appl. No.: 10/069,147

(22) PCT Filed: Aug. 28, 2000

(86) PCT No.: PCT/FR00/02387

§ 371 (c)(1),
(2), (4) Date: Sep. 11, 2002

(87) PCT Pub. No.: WO01/17752

PCT Pub. Date: Mar. 15, 2001

(30) Foreign Application Priority Data

Sep. 3, 1999 (FR) .......................................... 99 11150

(51) Int. Cl.⁷ .............................................. B29C 49/12
(52) U.S. Cl. .......................................... 425/3; 425/529
(58) Field of Search ............................ 425/3, 529, 535, 425/DIG. 33

(56) References Cited

U.S. PATENT DOCUMENTS

| | | | | |
|---|---|---|---|---|
| 3,438,086 A | * | 4/1969 | Valyi | 425/3 |
| 4,141,680 A | | 2/1979 | Kauffman et al. | |
| 4,284,397 A | * | 8/1981 | Michel | 425/529 |

FOREIGN PATENT DOCUMENTS

| | | |
|---|---|---|
| FR | 2 413 196 A | 7/1979 |
| FR | 2 662 631 A | 12/1991 |

* cited by examiner

*Primary Examiner*—Robert B. Davis
(74) *Attorney, Agent, or Firm*—Sughrue Mion, PLLC

(57) ABSTRACT

A machine for making thermoplastic containers by stretching and blowing a preform, comprising several molding stations mounted on a rotary carrousel, each station being provided with at least a stretch rod whereof the sliding movement is controlled along an axis (An). The stretch rod is controlled by a magnetic device having at least a fixed magnetic guide arranged about the axis of the carrousel and a slide which is integral with the stretch rod and bears at least a magnetic shoe and the shoe and the guide co-operate by magnetic coupling such that the guide imposes a predetermined axial movement on the slide.

8 Claims, 4 Drawing Sheets

ROTARY STRETCH BLOW MOULDING MACHINE COMPRISING A MAGNETICALLY CONTROLLED STRETCH ROD

The invention concerns machines for manufacturing containers of thermoplastic material by drawing and blow-molding a preform that has previously been produced by injection molding.

Such machines are used in particular to manufacture containers, for example polyethylene terephtalate (PET) bottles.

A machine of this type uses preforms that are appreciably tubular, closed at one of their axial ends, the other axial end being open and already in the definitive shape of the neck of the final container.

Each preform is heated in a thermal conditioning oven so as to bring the preform to a higher temperature than the glass transition temperature of the thermoplastic material. The conditioned preform is transferred to a blow mold in which a cavity is delimited in the shape of the container to be obtained. The preform is placed in the mold so that its open end extends outside the mold. Thus, a blow-molding device can be brought to the neck of the preform in order to inject air under pressure into the preform. Simultaneously, a drawing rod is inserted axially into the preform until it comes to rest against the closed end at the bottom of the preform. The drawing rod also allows better control of the preform's axial deformation during the blow-molding of the container.

One of the important parameters for the proper operation of such a blow-molding process is good control of the speed of movement of the drawing rod and the perfect synchronization of this movement with the triggering of the blow-molding.

The invention is more particularly intended to be used in a rotary type drawing/blow-molding machine in which the machine has several blow-molding stations mounted on the periphery of a carrousel that is continuously driven in rotation around its axis. Each blow-molding station has one blow mold, a blow-molding device and a drawing device.

According to one known design, the movement of the drawing rod is controlled by a pneumatic cylinder that furnishes the energy required to move the rod; but the rod's speed is regulated by a cam roller device that allows the axial position of the drawing rod to be perfectly synchronized based on the angular position of the particular blow-molding station around the axis of rotation of the carrousel.

These systems are entirely satisfactory in terms of operation of the blow-molding process. However, there is a need to greatly reduce the consumption of pressurized fluid of these blow-molding machines. One of the sources of consumption of previously-known machines is comprised of cylinders to control the drawing rod of each blow-molding station.

A purpose of the invention, therefore, is to propose a particularly simple and effective method of controlling the movements of the drawing rod without having to use a pressurized fluid, and without sacrificing the control of the triggering point and of the speed of movement of the rod.

To that end, the invention proposes a machine for manufacturing containers made of thermoplastic material by drawing and blow-molding a preform that has previously been produced by injection, of the type having several blow-molding stations that are mounted on a carrousel driven in continuous rotation around its axis with respect to a frame of the machine, and of the type in which each station is equipped with at least one drawing rod that is slidably controlled along its axis in order to draw the preform during the blow-molding operation, characterized in that the drawing rod is controlled by a magnetic device comprising a fixed magnetic guide placed around the axis of rotation of the carrousel and a slide that is integral with the drawing rod and which carries a magnetic block, and in that the block and the guide cooperate by magnetic coupling so that, depending on the angular position of the carrousel, the guide imposes a specific axial displacement on the slide.

According to other characteristics of the invention:
the magnetic coupling is accomplished with no contact;
the block and the guide cooperate opposite each other along a direction perpendicular to the axial direction of movement of the slide;
the guide is separated in several sections;
the machine has two paired guides that are placed side by side, the slide moving between the two paired guides;
at least one of the magnetic blocks is made in the form of a permanent magnet;
the slide has at least a first permanent magnet (32) that cooperates with a guide to control the slide in the direction of a first axial movement, and at least one second permanent magnet to control the slide in the opposite direction; and
the slide is held in one extreme axial position by a magnetic means integral with the carrousel.

Other characteristics and advantages of the invention will appear from the following detailed description, as well as in the appended drawings in which.

Figure 1:
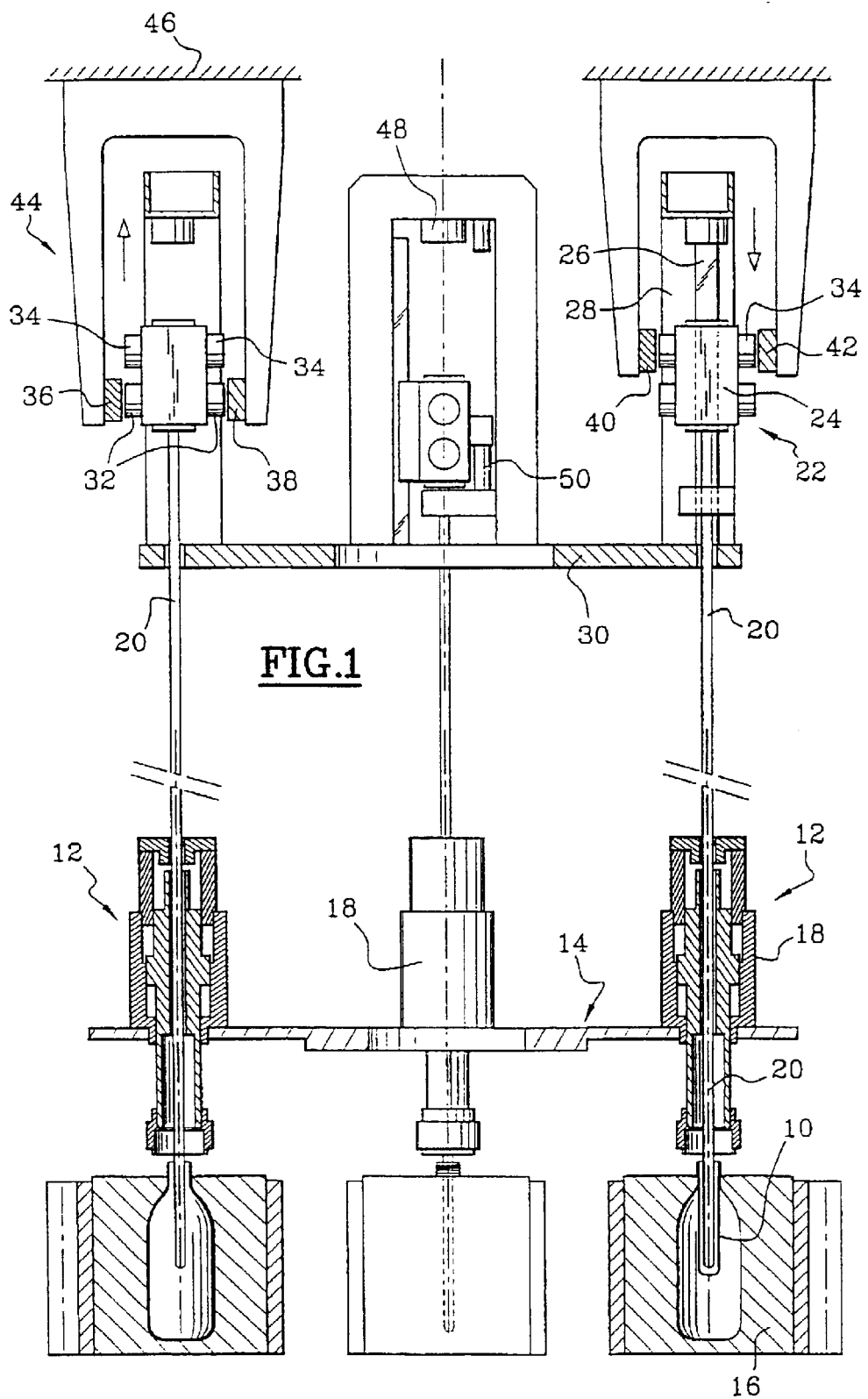
FIG. 1 is a diagrammatic view in axial cross section of a part of a rotary machine according to the invention.
Figure 2:
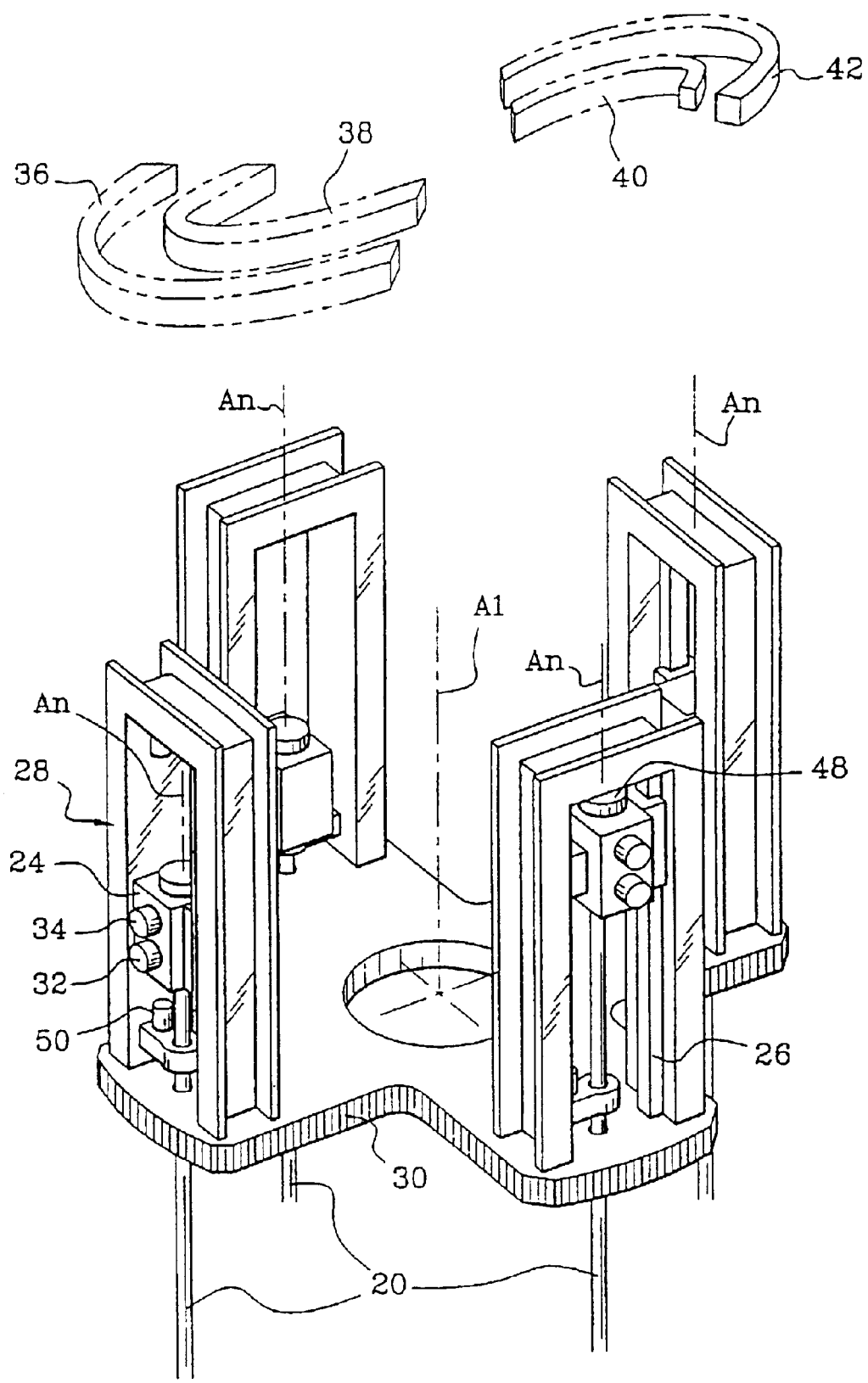
FIG. 2 is a diagrammatic exploded view in perspective of the upper part of the machine of FIG. 1.
Figure 3:
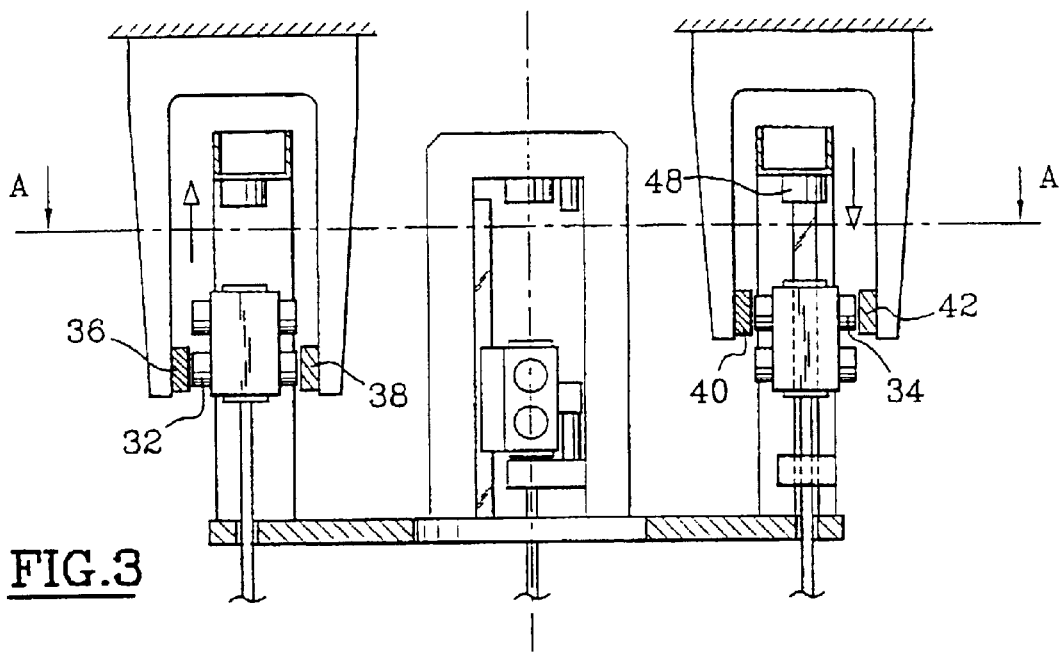
FIG. 3 is a partial view in axial cross section along line B—B of FIG. 4 illustrating more particularly the means of controlling the movements of the drawing rods.
Figure 4:
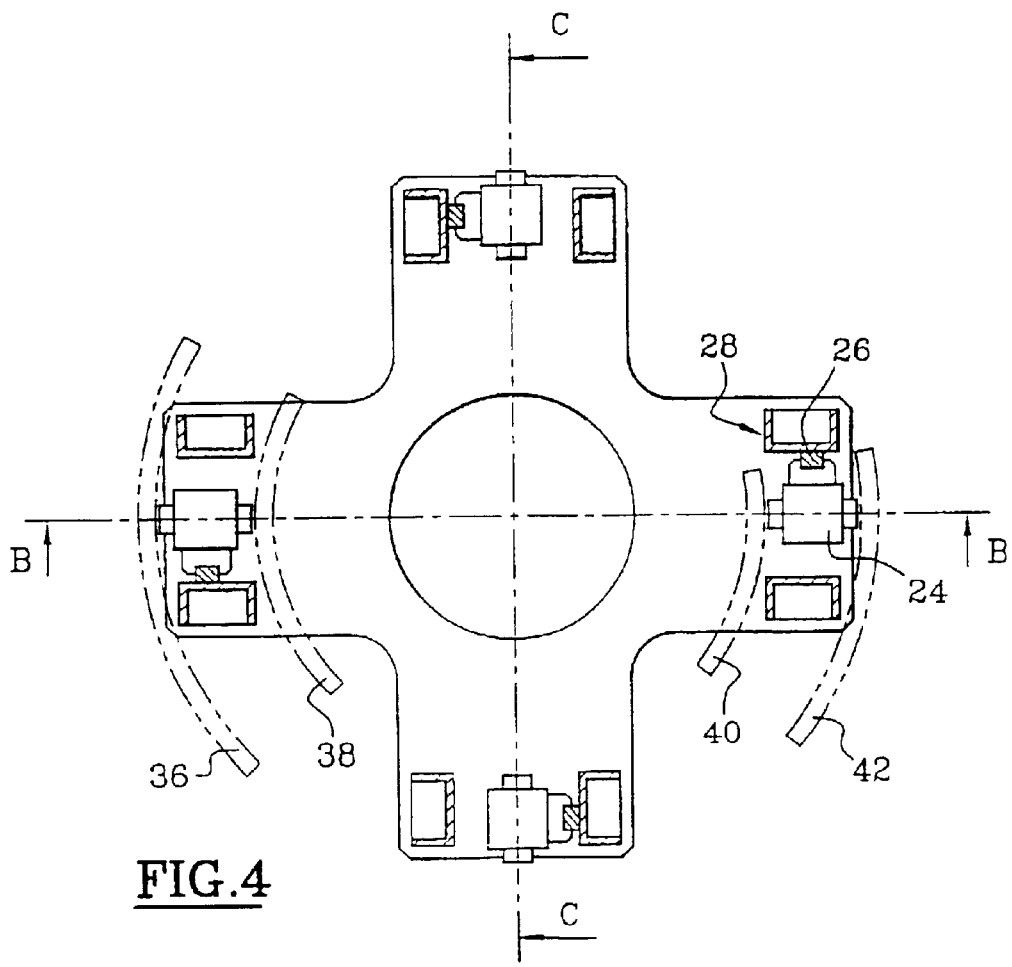
FIG. 4 is a cross sectional view along line A—A for FIG. 3.

Represented in the Figures, diagrammatically and partially, is a machine for manufacturing containers of thermoplastic material by drawing and blow-molding a preform 10 that was previously produced by injection molding.

More particularly, this machine is of the rotary type, that is, it has several drawing/blow-molding stations 12 mounted on a carrousel 14. The carrousel 14 is driven in continuous rotation around its axis A1.

Each drawing blow-molding station 12 essentially has a blow mold 16, a blow nozzle 18, a drawing rod 20 and means for controlling 22 the movements of the drawing rod 20.

In the illustrated example, the axis A1 of rotation of the carrousel 14 is a vertical axis and each drawing station 12 is placed along a vertical axis An, the axes An being arranged at 90 degrees from each other in a circle around the axis A1. The preforms 10 are blown with their open end turned upward so that the blow nozzle 18 and the drawing rod 20 are placed above the mold 16. This arrangement gives rise to the notions of up and down that will be used in the following text, but that should not be interpreted as limitations to the scope of the invention.

As a result of this arrangement, the drawing rod 20 of each station 12 is therefore moved vertically along the respective axis An between an upper position and a lower position.

More precisely, because each blow-molding station proceeds with the blow-molding of a container with each turn of the carrousel 14, the rods 20 make a round-trip between their upper and lower positions with each turn of the carrousel 14.

In a known way, the rods 20 are attached at their upper end to a slide 24 that can slide vertically on a rail 26 mounted on a frame support 28 integral with the carrousel 14. The frame support 28 is in the shape of an inverted U and is composed of two vertical members joined at the top by a cross piece. The frame support 28 extends in a plane perpendicular to a radius of the carrousel and the guide rail 26 of the slide is attached to one of the vertical members of the frame support so that the slide is received between the two vertical members.

The rod 20 extends downward through an orifice made in an upper plate 30 of the carrousel on which the frame supports 28 corresponding to the different blow-molding units are attached. Moreover, in a known way, each rod 20 extends axially through the respective blow nozzle 18 so that its lower end can engage axially in a preform held in a cavity of the mold 16.

According to the invention, the control means 22 that cause the movement of the drawing rods 20 during rotation of the carrousel 14 involve magnetic means.

Thus, each slide carries at least one magnet that is intended to cooperate remotely with the guides made of magnetic material that are arranged on the periphery of the carrousel and which are integral with a fixed frame of the machine. The guides thus extend along the spiral arcs of axis A1.

In the example illustrated, each slide 24 has two pairs 32, 34 of magnets.

A first pair of magnets 32 is provided to ensure the lifting of the rod 20 toward its top position. One of this pair of lifting magnets 32 is placed on one face of the slide 24 that is turned radially outward. It is provided to cooperate with an outer guide 36 that is placed outside the path of the frame supports 28. The second of these lifting magnets 32 is turned radially inward and it cooperates with an inner guide 38 placed inside the path of the frame supports. The two guides, inner and outer, that provide for the lifting of the slide are arranged parallel to each other and are separated by a space between them that allows the frame supports 28 and the slides 24 to pass.

In the same way, each slide 24 has two inner and outer lowering magnets 34 that cooperate with the parallel inner 40 and outer 42 lowering guides.

In the example illustrated, the lifting magnets 32 are placed on the slide 24 below the lowering magnets 34.

The guides 36, 38, 40, 42 are, for example, borne by forks 44 in inverted U-shape that are hooked by their upper part below an upper plate 46 of the frame of the machine. Obviously, the separation of the two parts of each fork 44 is such as to allow the passage of the frame supports 28.

In addition, the control means 22 have upper and lower stops that can hold each slide 24, and thus the rods 20, in the upper and lower position. In the example proposed, each frame support 28 thus has one upper magnetic stop 48 and one lower magnetic stop 50 against which the slide can be held in the upper and lower position, respectively.

Figure 5:
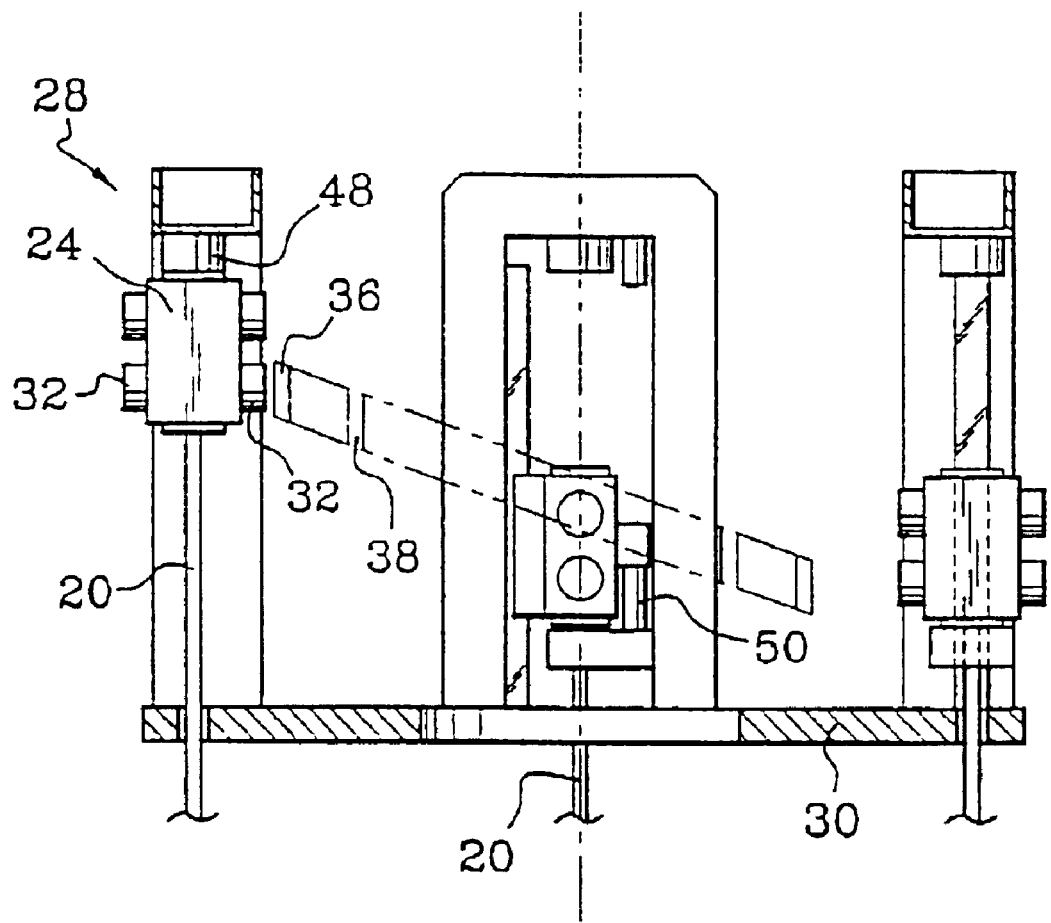
FIG. 5 is a cross sectional view along line C—C of FIG. 4.

The lifting guides 36, 38 thus are placed on the frame of the machine so that their upstream end, with respect to the direction of rotation of the carrousel 14, is situated vertically at the height of the lifting magnets 32 of the slides 24 when the slides are in the lower position. Their downstream end is situated at the height of the lifting magnets 32 when the slides are in the upper position. Between the two, the guides can follow a regular descent, as illustrated in FIG. 5, or they can follow a variable slope in order to obtain a particular variation in speed of the drawing rods.

In the opposite direction, the two lowering guides 40, 42 follow a slope between the upper and lower positions of the lowering magnets 34.

Thus, during the rotation of the carrousel 14, when one of the magnets of a slide 24 arrives opposite the upstream end of the respective guide, the magnetic flux of this magnet is looped back on the guide so that it exerts a large force of attraction between the guide and the magnet. Also, starting with this moment of "engagement," the variation in height of the guide results in an effort exerted by the magnet on the slide in a direction such that the slide follows the path of the guide. In effect, the slide is released from its initial stopped position and is taken during the rotation of the carrousel to its other stopped position. By selecting sufficiently-powerful magnets and using good geometry in the parts, very good precision is obtained in vertically guiding the slide along its path. Indeed, the force of attraction between the magnet and the respective guide is such that, for a given angular position of the carrousel, it allows nearly no shift between the vertical position of the slide 24 and that of the guide.

The invention thus achieves a particularly simple and reliable control of the movements of the drawing rods. These magnetic means are advantageous because, compared to pneumatic cylinders, they make it possible to avoid any consumption of compressed air. Because they operate without contact, they are not subject to wear. Moreover, they are particularly simple to adjust. To adapt the machine to a new container format, for example, only the upper and lower stop positions of the slide 24 will have to be changed. As a variation, sets of guides could be provided that are adapted to the drawing travel of the rods 20.

In the example illustrated, it was decided to use two lifting magnets and two lowering magnets for each blow-molding station, resulting in the need for two paired lifting guides and two paired lowering guides. However, in certain applications, a single lifting magnet and a single lowering magnet would be sufficient, which would also make it possible to reduce the number of guides. Moreover, while it was decided in the example illustrated to distinguish the lowering magnets from the lifting magnets, it is also possible for the same magnet to perform both functions.

Of course, other variations of the invention are still possible. The lifting and lowering magnets, which here are in the form of permanent magnets, could be replaced by electromagnets. This is also true for the upper and lower magnetic stops.

In addition, the invention can also be implemented in machines where the blow molds have several cavities to allow the blow-molding of several containers simultaneously. In this case, the slide of each drawing/blow-molding station will carry several drawing rods.

What is claimed is:

1. Machine for manufacturing containers made of thermoplastic material by drawing and blow-molding a preform (10), of the type having several blow-molding stations (12) that are mounted on a carrousel (14) driven in continuous rotation around its axis (A1) with respect to a frame (46) of the machine, and of the type in which each station (12) is equipped with at least one drawing rod (20) that is slidably controlled along its axis (An) in order to draw the preform (10) during the blow-molding operation, characterized in that the drawing rod (20) is controlled by a magnetic device comprising at least one fixed magnetic guide (36, 38, 40, 42) placed around the axis of rotation (A&) of the carrousel (14) and a slide (24) that is integral with the drawing rod (20) and which carries at least one magnetic block (32, 34), and in that the block and the guide cooperate by magnetic coupling so that, depending on the angular position of the carrousel (14), the guide imposes a specific axial displacement on the slide (24).

2. Machine according to claim 1, characterized in that the magnetic coupling is accomplished with no contact.

3. Machine according to claim 2, characterized in that the block (32, 34) and the guide (36, 38, 40, 42) cooperate opposite each other along a direction perpendicular to the axial direction (An) of movement of the slide (24).

4. Machine according to claim 1, characterized in that the guide is separated in several sections.

5. Machine according to claim 1, characterized in that the machine has two paired guides (36, 38) (40, 42) that are placed side-by-side, the slide (24) moving between the two paired guides.

6. Machine according to claim 1, characterized in that at least one of the magnetic blocks is made in the form of a permanent magnet.

7. Machine according to claim 6, characterized in that the slide (24) has at least one first permanent magnet (32) that cooperates with a guide (36, 38) to control the slide (24) in the direction of a first axial movement, and at least one second permanent magnet (34) to control the slide in the opposite direction.

8. Machine according to claim 1, characterized in that the slide (24) is held in one extreme axial position by a magnetic means (48, 50) integral with the carrousel (28, 14).

* * * * *